(12) United States Patent
de-Gregorio-Rodriguez et al.

(10) Patent No.: US 12,167,324 B2
(45) Date of Patent: Dec. 10, 2024

(54) BOOTSTRAPPING SERVICE FOR NRF AND NSSF

(71) Applicant: Telefonaktiebolaget LM Ericsson (publ), Stockholm (SE)

(72) Inventors: Jesus-Angel de-Gregorio-Rodriguez, Madrid (ES); David Castellanos Zamora, Madrid (ES); Xinyu Zhang, Shanghai (CN); Magnus Hallenstål, Täby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 376 days.

(21) Appl. No.: 17/635,741

(22) PCT Filed: Aug. 10, 2020

(86) PCT No.: PCT/IB2020/057522
§ 371 (c)(1),
(2) Date: Feb. 16, 2022

(87) PCT Pub. No.: WO2021/033074
PCT Pub. Date: Feb. 25, 2021

(65) Prior Publication Data
US 2022/0272622 A1 Aug. 25, 2022

Related U.S. Application Data

(60) Provisional application No. 62/887,784, filed on Aug. 16, 2019.

(51) Int. Cl.
*H04W 48/18* (2009.01)
*H04W 48/16* (2009.01)
*H04W 84/04* (2009.01)

(52) U.S. Cl.
CPC ............ *H04W 48/18* (2013.01); *H04W 48/16* (2013.01); *H04W 84/042* (2013.01)

(58) Field of Classification Search
None
See application file for complete search history.

(56) References Cited

U.S. PATENT DOCUMENTS 10,819,676 B1 * 10/2020 Kolanowski ............ H04W 4/50
2016/0149771 A1    5/2016 Prasad et al.
(Continued)

FOREIGN PATENT DOCUMENTS

CN    114503644 A      5/2022
WO    2018232241 A1    12/2018

OTHER PUBLICATIONS

Author Unknown, "Technical Specification Group Core Network and Terminals; Numbering, addressing and identification (Release 15)," Technical Specification 23.003, Version 15.7.0, Jun. 2019, 3GPP Organizational Partners, 131 pages.
(Continued)

*Primary Examiner* — Kenny S Lin
(74) *Attorney, Agent, or Firm* — Withrow & Terranova, PLLC

(57) ABSTRACT

Systems and methods related to a bootstrapping service for a network function (NF) in a core network of a cellular communications system are disclosed. In one embodiment, a method performed by a first NF in a core network of a cellular communications system comprises receiving, from a second NF, a request for services exposed by the first NF. The method further comprises, responsive to receiving the request, sending, to the second NF, information about one or more services exposed by the first NF. In one embodiment, the information about one or more services exposed by the first NF includes Application Programming Interface (API) versions of the one or more services. In this manner,
(Continued)

flexibility is provided in the network since there is no need for static configuration of service parameters.

28 Claims, 8 Drawing Sheets

(56) References Cited

U.S. PATENT DOCUMENTS

| | | |
|---|---|---|
| 2017/0323089 A1 | 11/2017 | Duggal et al. |
| 2019/0098498 A1 | 3/2019 | Badulescu et al. |
| 2021/0258861 A1* | 8/2021 | Wang .................... H04W 48/14 |

OTHER PUBLICATIONS

Author Unknown, "Technical Specification Group Services and System Aspects; System Architecture for the 5G System; Stage 2 (Release 16)," Technical Specification 23.501, Version 16.1.0, Jun. 2019, 3GPP Organizational Partners, 368 pages.

Author Unknown, "Technical Specification Group Core Network and Terminals; 5G System; Technical Realization of Service Based Architecture; Stage 3 (Release 16)," Technical Specification 29.500, Version 16.0.0, Jun. 2019, 3GPP Organizational Partners, 36 pages.

Author Unknown, "Technical Specification Group Core Network and Terminals; 5G System; Network Function Repository Services; Stage 3 (Release 16)," Technical Specification 29.510, Version 16.0.0, Jun. 2019, 3GPP Organizational Partners, 135 pages.

Author Unknown, "Technical Specification Group Core Network and Terminals; 5G System; Network Slice Selection Services; Stage 3 (Release 15)," Technical Specification 29.531, Version 15.4.0, Jun. 2019, 3GPP Organizational Partners, 53 pages.

Author Unknown, "Technical Specification Group Core Network and Terminals; 5G System; Network Slice Selection Services; Stage 3 (Release 16)," Technical Specification 29.531, Version 16.0.0, Sep. 2019, 3GPP Organizational Partners, 53 pages.

Author Unknown, "Technical Specification Group Core Network and Terminals; 5G System; Common Data Types for Service Based Interfaces; Stage 3 (Release 16)," Technical Specification 29.571, Version 16.0.0, Jun. 2019, 3GPP Organizational Partners, 79 pages.

Ericsson, "C4-193abc: Discussion Paper: Bootstrapping Service for Inter-PLMN Scenarios," 3GPP TSG-CT WG4 Meeting #93, Aug. 26-30, 2019, Wroclaw, Poland, 2 pages.

Ericsson, "C4-193403: Discussion Paper: Service URIs in Inter-PLMN Scenarios," 3GPP TSG-CT WG4 Meeting #93, Aug. 26-30, 2019, Wroclaw, Poland, 2 pages.

Orange, "C4-184317: Pseudo-CR on Discovery of the supported versions using Get," 3GPP TSG CT WG4 Meeting #85, May 21-25, 2018, Osaka, Japan, 2 pages.

International Search Report and Written Opinion for International Patent Application No. PCT/IB2020/057522, mailed Oct. 7, 2020, 18 pages.

Written Opinion for International Patent Application No. PCT/IB2020/057522, mailed Aug. 3, 2021, 11 pages.

Office Action for Colombian Patent Application No. NC2022/0002926, mailed Nov. 11, 2022, 24 pages.

Office Action for Colombian Patent Application No. NC2022/0002926, mailed Jan. 24, 2024, 16 pages.

Office Action for Colombian Patent Application No. NC2022/0002926, mailed Feb. 14, 2023, 39 pages.

* cited by examiner

BOOTSTRAPPING SERVICE FOR NRF AND NSSF

RELATED APPLICATIONS

This application is a 35 U.S.C. § 371 national phase filing of International Application No. PCT/IB2020/057522, filed Aug. 10, 2020, which claims the benefit of provisional patent application Ser. No. 62/887,784, filed Aug. 16, 2019, the disclosures of which are hereby incorporated herein by reference in its entirety their entireties.

TECHNICAL FIELD

The present disclosure relates to interactions between Network Functions (NFs) and a NF Repository Function (NRF) or Network Slice Selection Function (NSSF) in a core network of a cellular communications system.

BACKGROUND

Interactions between Network Functions (NFs) in Roaming Scenarios: In the scope of the Fifth Generation (5G) core network service-based architecture, and in particular in roaming scenarios, a NF in a visited Public Land Mobile Network (PLMN) (vPLMN) needs to interact with NFs in the home PLMN (hPLMN). For most interactions, the NF in the vPLMN (which is referred to herein as a "vNF") will discover the address and services of the NFs in the hPLMN (which is referred to herein as a "hNF") by means of the NF Repository Function (NRF) discovery service. For that, the vNFs only interact with NRFs in their own PLMN (i.e., the vPLMN); therefore, the vNF will invoke the discovery service in the visited NRF (vNRF), and the vNRF in turn will invoke the discovery service in the home NRF (hNRF). This means that there must be some way for the vNRF to determine the address and service parameters of the hNRF. This can be done in two different ways. For the first way, as part of a Service-Level Agreement (SLA) between the hPLMN and the vPLMN, there can be static configuration parameters in the vNRF that indicates how to interact with the hNRF. For the second way, if such static configuration does not exist, the vNRF needs to dynamically construct the address of the hNRF based on the Mobile Country Code (MCC)/Mobile Network Code (MNC) values of the User Equipment (UE) that is camping on the vPLMN.

Currently, Third Generation Partnership Project (3GPP) Technical Specification (TS) 23.003 clause 28.3.2.3 specifies the following:

The Fully Qualified Domain Name (FQDN) of the hNRF shall be constructed as follows: nrf.5gc.mnc<MNC>.mcc<MCC>0.3gppnetwork.org.

The Hyper-Text Transfer Protocol (HTTP) schema of the Uniform Resource Indicators (URIs) in the hNRF shall be "https".

The Transmission Control Protocol (TCP) port shall be 443 (default port for https).

The deployment specific string (Application Programming Interface (API) prefix) shall not be used.

This means that the base URI of the NRF would be as follows: https://nrf.5gc.mnc<MNC>.mcc<MCC>0.3gppnetwork.org. However, even with all the information above, it is still not possible for the vNRF to invoke services on the hNRF because the vNRF needs to construct URIs with the following structure:

For NF discovery service:
https://nrf.5gc.mnc<MNC>.mcc<MCC>0.3gppnetwork.org/nnrf-disc/v1/nf-instances;

For NF management service:
https://nrf.5gc.mnc<MNC>.mcc<MCC>0.3gppnetwork.org/nnrf-nfm/v1/subscriptions.

The "v1" path segment refers to the major version of the full API version (e.g., if the API version is 1.2.0, it refers to the first digit, prepended by the letter "v", i.e. "v1"). This is a mandatory component of almost all service URIs in the 3GPP APIs.

Normally, the version of a given API is discovered by means of the NRF discovery service itself; but, for the NRF APIs themselves, there is currently no way to do such discovery. FIG. 1 is a call flow diagram illustrating a conventional process for interaction between a vNF and an hNF. In step 1, the vNF determines the address of the vNRF by means of local configuration, which is feasible given that it is a configuration local to the vPLMN. In step 2, the vNRF, in the absence of static configuration (SLA) about the hPLMN, builds the address of the hNRF based on the MCC/MNC of the UE. Still, the vNRF lacks information about the version of the API deployed by the hNRF, and accordingly defaults to using the lowest version (v1) of the API deployed by the hNRF. In step 3, the hNRF returns the search result of the discovery to the vNRF. In step 4, the vNRF returns the search result of the discovery to the vNF.

In addition to the scenario above, an identical problem exists for the Network Slice Selection Function (NSSF). The visited NSSF (vNSSF) needs to invoke services from the home NSSF (hNSSF) and, in order to do that, it needs to either rely on static configuration or dynamically construct a service request URI that uses the MCC/MNC of the UE (see 3GPP TS 23.003, clause 28.3.2.4). However, the vNSSF needs to know the version of the APIs deployed by the hNSSF. Accordingly, the same problem for communication between a vNRF and an hNRF exists between a vNSSF and an hNSSF.

There currently exist certain challenge(s). There is currently no solution in 3GPP to address the problem described above. As of today, the vNRF (or vNSSF) has no other means than defaulting to version 1 (v1) or, otherwise, rely on static configuration (SLA) when accessing APIs deployed by an hNRF (or hNSSF). This has a severe limitation, and it is much more preferable to provide a fully dynamic solution that does not impose to have pre-agreed configuration parameters in order to determine how to invoke NRF (or NSSF) services on another PLMN.

SUMMARY

Systems and methods related to a bootstrapping service for a Network Function (NF) in a core network of a cellular communications system are disclosed. In one embodiment, a method performed by a first NF in a core network of a cellular communications system comprises receiving, from a second NF, a request for services exposed by the first NF. The method further comprises, responsive to receiving the request, sending, to the second NF, information about one or more services exposed by the first NF. In one embodiment, the information about one or more services exposed by the first NF includes Application Programming Interface (API) versions of the one or more services. In this manner, flexibility is provided in the network since there is no need for static configuration of service parameters.

In one embodiment, the first NF is a NF Repository Function (NRF), and the second NF is a NF service consumer. In one embodiment, the first NF is a home NRF (hNRF) in a home Public Land Mobile Network (PLMN) (hPLMN) of a particular User Equipment (UE), and the second NF is a visited NRF (vNRF) in a visited PLMN (vPLMN) of the particular UE.

In one embodiment, the first NF is a Network Slice Selection Function (NSSF), and the second NF is an NF service consumer. In one embodiment, the first NF is a home NSSF (hNSSF) in an hPLMN of a particular UE, and the second NF is a visited NSSF (vNSSF) in a vPLMN of the particular UE.

In one embodiment, receiving the request comprises receiving the request for a bootstrapping service of the first NF. In one embodiment, the first NF is a NRF, and the bootstrapping service is separate from a discovery service of the NRF. In one embodiment, the request is a Hyper-Text Transfer Protocol (HTTP) GET request addressed to {nrfApiRoot}/bootstrapping, where {nrfApiRoot} is a concatenation of a scheme component and an authority component of the NRF. In another embodiment, the request is a HTTP GET request addressed to https://nrf.5gc.mnc<MNC>.mcc<MCC>0.3gppnetwork.org/bootstrapping, where "MNC" is a Mobile Network Code of a particular UE associated with the request and "MCC" is a Mobile Country Code of the particular UE. In one embodiment, the request comprises an indication of support for a Hypermedia as the Engine of Application State (HATEOAS) format. In one embodiment, the HATEOAS format is the 3gppHal+json format. In one embodiment, sending the information about the one or more services exposed by the first NF to the second NF comprises sending the information in a HATEOAS document that contains a number of link relations that correspond to the one or more services exposed by the first NF and base Uniform Resource Indicators (URIs) of the one or more services, wherein the base URIs comprise API major versions of the one or more services.

In one embodiment, the information about the one or more services exposed by the first NF comprises API versions of the one or more services exposed by the first NF. In one embodiment, the information about the one or more services exposed by the first NF further comprises one or more additional parameters. In one embodiment, the one or more additional parameters comprise load, status, or both load and status.

Corresponding embodiments of a first NF for a core network of a cellular communications system are also disclosed. In one embodiment, a first NF for a core network of a cellular communications system is adapted to receive, from a second NF, a request for services exposed by the first NF. The first NF is further adapted to, responsive to receiving the request, send, to the second NF, information about one or more services exposed by the first NF.

In one embodiment, a network node that implements a first NF for a core network of a cellular communications system comprises processing circuitry configured to cause the network node to receive, from a second NF, a request for services exposed by the first NF. The processing circuitry is further configured to cause the network node to, responsive to receiving the request, send, to the second NF, information about one or more services exposed by the first NF.

Embodiments of a method performed by a second NF in a core network of a cellular communications system are also disclosed. In one embodiment, a method performed by a second NF in a core network of a cellular communications system comprises sending, to a first NF, a request for services exposed by the first NF. The method further comprises, responsive to sending the request, receiving, from the first NF, information about one or more services exposed by the first NF. In one embodiment, the information about one or more services exposed by the first NF includes API versions of the one or more services.

In one embodiment, the first NF is an NRF, and the second NF is an NF service consumer. In one embodiment, the first NF is an hNRF in an hPLMN of a particular UE, and the second NF is a vNRF in a vPLMN of the particular UE.

In one embodiment, the first NF is a NSSF, and the second NF is an NF service consumer. In one embodiment, the first NF is an hNSSF in an hPLMN of a particular UE, and the second NF is a vNSSF in a vPLMN of the particular UE.

In one embodiment, sending the request comprises sending the request to a bootstrapping service of the first NF. In one embodiment, the first NF is an NRF, and the bootstrapping service is separate from a discovery service of the NRF. In one embodiment, the request is an HTTP GET request addressed to {nrfApiRoot}/bootstrapping, where {nrfApiRoot} is a concatenation of a scheme component and an authority component of the NRF. In another embodiment, the request is an HTTP GET request addressed to https://nrf.5gc.mnc<MNC>.mcc<MCC>0.3gppnetwork.org/bootstrapping, where "MNC" is a MNC of a particular UE associated with the request and "MCC" is a MCC of the particular UE. In one embodiment, the request comprises an indication of support for a HATEOAS format. In one embodiment, the HATEOAS format is the 3gppHal+json format. In one embodiment, receiving the information about the one or more services exposed by the first NF comprises receiving the information in a HATEOAS document that contains a number of link relations that correspond to the one or more services exposed by the first NF and base URIs of the one or more services, wherein the base URIs comprise API major versions of the one or more services.

In one embodiment, the information about the one or more services exposed by the first NF comprises API versions of the one or more services exposed by the first NF. In one embodiment, the information about the one or more services exposed by the first NF further comprises one or more additional parameters. In one embodiment, the one or more additional parameters comprise load, status, or both load and status.

Corresponding embodiments of a second NF for a core network of a cellular communications system are also disclosed. In one embodiment, a second NF for a core network of a cellular communications system is adapted to send, to a first NF, a request for services exposed by the first NF. The second NF is further adapted to, responsive to sending the request, receive, from the first NF, information about one or more services exposed by the first NF.

In one embodiment, a network node that implements a second NF for a core network of a cellular communications system comprises processing circuitry configured to cause the network node to send, to a first NF, a request for services exposed by the first NF. The processing circuitry is further configured to cause the network node to, responsive to sending the request, receive, from the first NF, information about one or more services exposed by the first NF.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
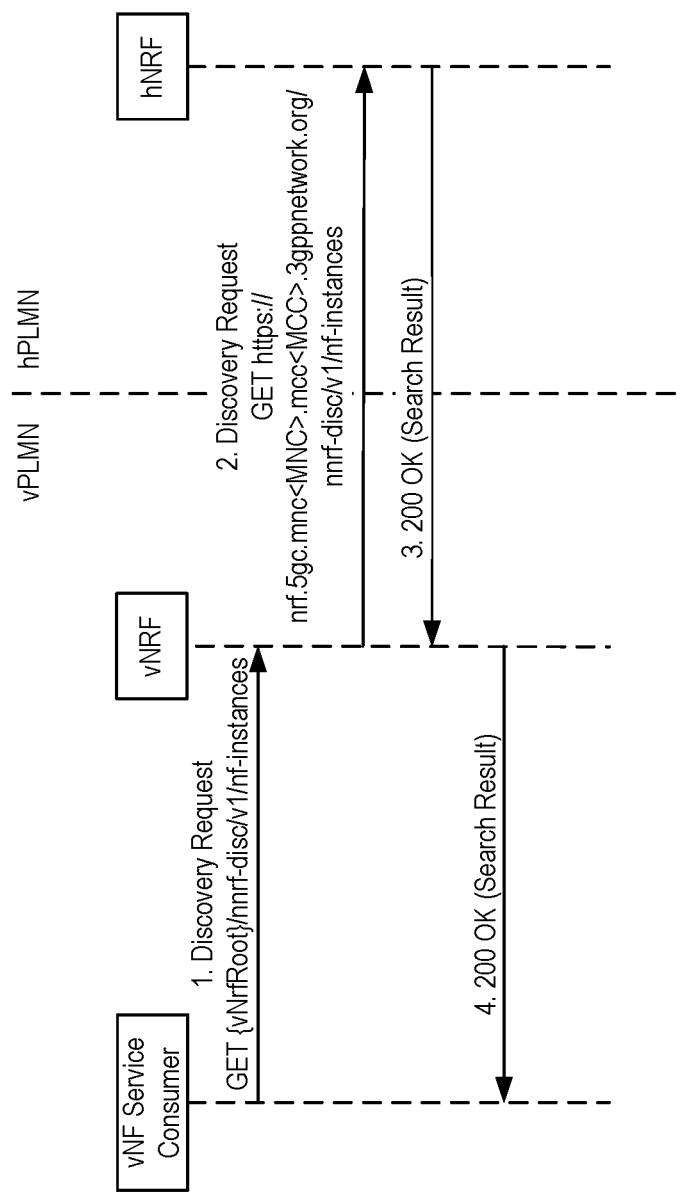
FIG. 1 is a call flow diagram illustrating a conventional process for interaction between a visited Network Function (NF) (vNF) and a home NF (hNF)

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless device.

Radio Access Node: As used herein, a "radio access node" or "radio network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing an Access and Mobility Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Network Node: As used herein, a "network node" is any node that is either part of the RAN or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

Certain aspects of the present disclosure and their embodiments may provide solutions to the aforementioned or other challenges. It is proposed to define a version-independent bootstrapping service for the NRF (and similarly for the NSSF) that can be invoked by NFs in a visited Public Land Mobile Network (PLMN) (vPLMN) (i.e., by a visited NRF (vNRF) and a visited NSSF (vNSSF)) so the actual versions (and potentially other service parameters) can be learned by the invoker. The returned information will be defined following the principle of Hypermedia as the Engine of Application State (HATEOAS) in order to accommodate one of the main Representational State Transfer (REST) design goals for the 3GPP core network Application Programming Interfaces (APIs).

In one embodiment, a bootstrapping service is provided that allows NFs in a vPLMN to learn dynamically about the services exposed by NFs in a home PLMN (hPLMN) that are not discovered by means of the NRF discovery service. Rather than relying on static configuration, the NFs can get initial information that allows them to invoke further services such as the NRF discovery service on the hPLMN.

Certain embodiments may provide one or more of the following technical advantage(s). The principles described in the present disclosure provide several advantages to the operation of a network including:
  great flexibility, since the services offered by the NFs in the hPLMN can be "discovered" by NFs in the vPLMN, and therefore there is no need for static configuration of service parameters; and
  simplicity and standards compliance.

Figure 2:
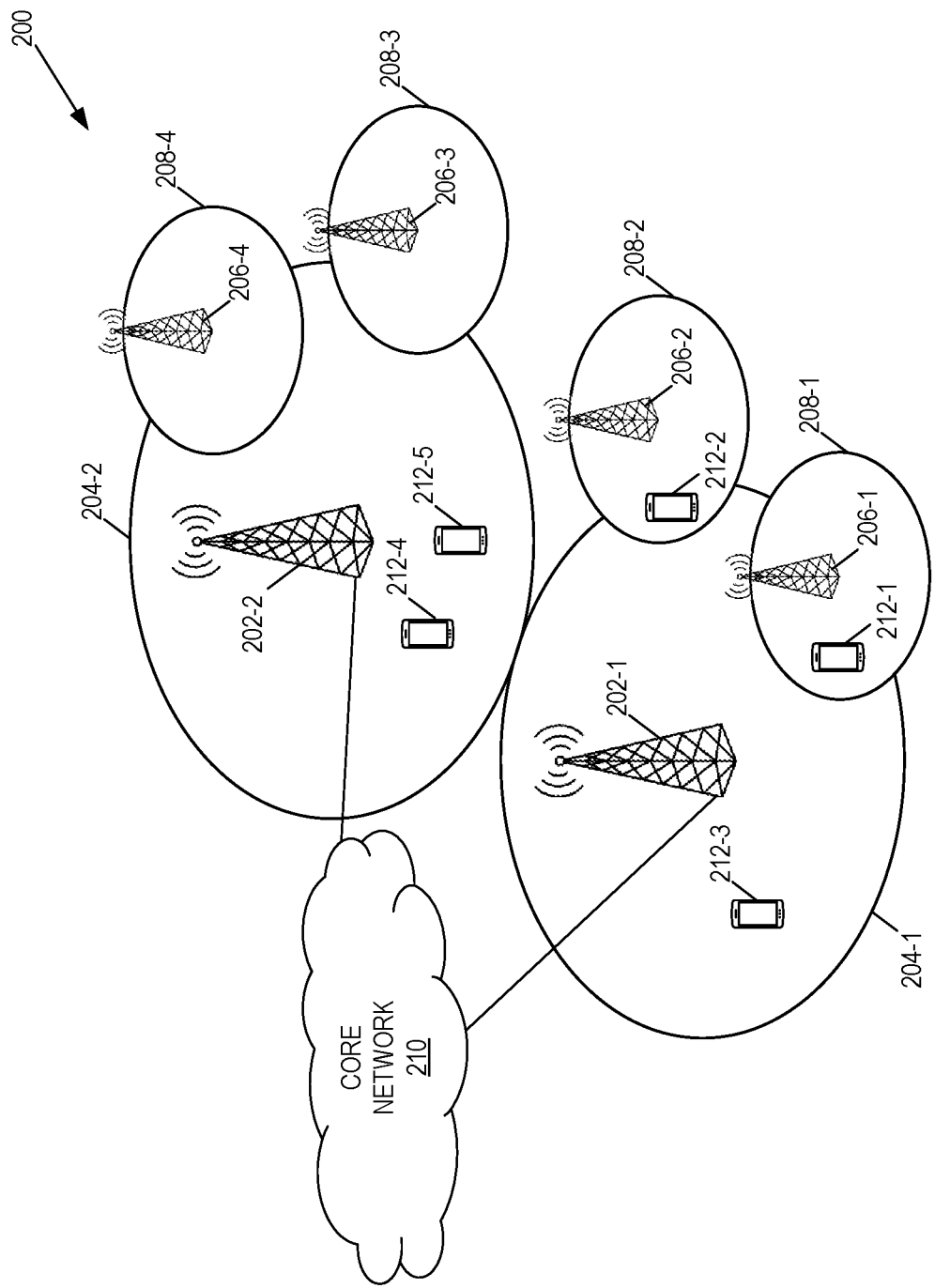
FIG. 2 illustrates one example of a cellular communications system in which embodiments of the present disclosure may be implemented.

FIG. 2 illustrates one example of a cellular communications system 200 in which embodiments of the present disclosure may be implemented. In the embodiments described herein, the cellular communications system 200 is a 5G System (5GS) including a NR RAN. In this example, the RAN includes base stations 202-1 and 202-2, which in 5G NR are referred to as gNBs, controlling corresponding (macro) cells 204-1 and 204-2. The base stations 202-1 and 202-2 are generally referred to herein collectively as base stations 202 and individually as base station 202. Likewise, the (macro) cells 204-1 and 204-2 are generally referred to herein collectively as (macro) cells 204 and individually as (macro) cell 204. The RAN may also include a number of low power nodes 206-1 through 206-4 controlling corresponding small cells 208-1 through 208-4. The low power nodes 206-1 through 206-4 can be small base stations (such as pico or femto base stations) or Remote Radio Heads (RRHs), or the like. Notably, while not illustrated, one or more of the small cells 208-1 through 208-4 may alternatively be provided by the base stations 202. The low power nodes 206-1 through 206-4 are generally referred to herein collectively as low power nodes 206 and individually as low power node 206. Likewise, the small cells 208-1 through 208-4 are generally referred to herein collectively as small cells 208 and individually as small cell 208. The cellular communications system 200 also includes a core network 210, which in the 5GS is referred to as the 5G Core (5GC). The base stations 202 (and optionally the low power nodes 206) are connected to the core network 210.

The base stations 202 and the low power nodes 206 provide service to wireless devices 212-1 through 212-5 in the corresponding cells 204 and 208. The wireless devices 212-1 through 212-5 are generally referred to herein collectively as wireless devices 212 and individually as wireless device 212. The wireless devices 212 are also sometimes referred to herein as UEs.

Figure 3:
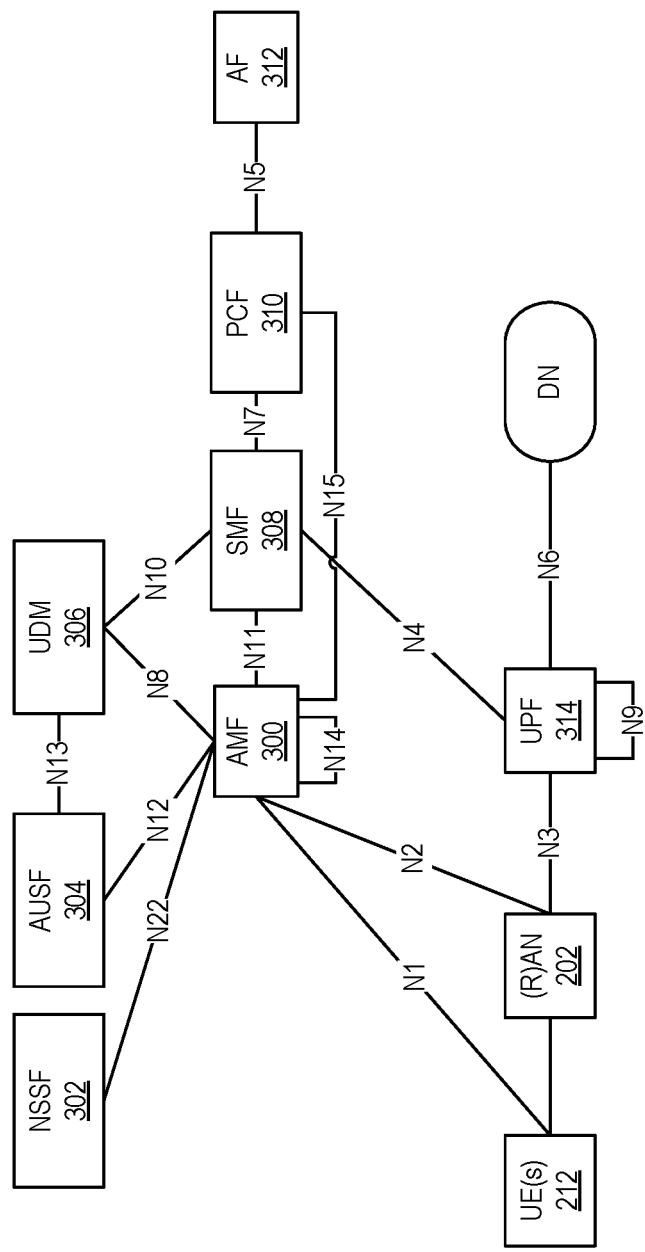
FIGS. 3 and 4 illustrate examples in which the cellular communications system is a Fifth Generation (5G) System (5GS)

FIG. 3 illustrates a wireless communication system represented as a 5G network architecture composed of core NFs, where interaction between any two NFs is represented by a point-to-point reference point/interface. FIG. 3 can be viewed as one particular implementation of the system 200 of FIG. 2.

Seen from the access side the 5G network architecture shown in FIG. 3 comprises a plurality of UEs 212 connected to either a RAN 202 or an Access Network (AN) as well as an AMF 300. Typically, the R(AN) 202 comprises base stations, e.g. such as eNBs or gNBs or similar. Seen from the core network side, the 5GC NFs shown in FIG. 3 include a NSSF 302, an AUSF 304, a UDM 306, the AMF 300, a SMF 308, a PCF 310, and an Application Function (AF) 312.

Reference point representations of the 5G network architecture are used to develop detailed call flows in the normative standardization. The N1 reference point is defined to carry signaling between the UE 212 and AMF 300. The reference points for connecting between the AN 202 and AMF 300 and between the AN 202 and UPF 314 are defined as N2 and N3, respectively. There is a reference point, N11, between the AMF 300 and SMF 308, which implies that the SMF 308 is at least partly controlled by the AMF 300. N4 is used by the SMF 308 and UPF 314 so that the UPF 314 can be set using the control signal generated by the SMF 308, and the UPF 314 can report its state to the SMF 308. N9 is the reference point for the connection between different UPFs 314, and N14 is the reference point connecting between different AMFs 300, respectively. N15 and N7 are defined since the PCF 310 applies policy to the AMF 300 and SMF 308, respectively. N12 is required for the AMF 300 to perform authentication of the UE 212. N8 and N10 are defined because the subscription data of the UE 212 is required for the AMF 300 and SMF 308.

The 5GC network aims at separating user plane and control plane. The user plane carries user traffic while the control plane carries signaling in the network. In FIG. 3, the UPF 314 is in the user plane and all other NFs, i.e., the AMF 300, SMF 308, PCF 310, AF 312, NSSF 302, AUSF 304, and UDM 306, are in the control plane. Separating the user and control planes guarantees each plane resource to be scaled independently. It also allows UPFs to be deployed separately from control plane functions in a distributed fashion. In this architecture, UPFs may be deployed very close to UEs to shorten the Round Trip Time (RU) between UEs and data network for some applications requiring low latency.

The core 5G network architecture is composed of modularized functions. For example, the AMF 300 and SMF 308 are independent functions in the control plane. Separated AMF 300 and SMF 308 allow independent evolution and scaling. Other control plane functions like the PCF 310 and AUSF 304 can be separated as shown in FIG. 3. Modularized function design enables the 5GC network to support various services flexibly.

Each NF interacts with another NF directly. It is possible to use intermediate functions to route messages from one NF to another NF. In the control plane, a set of interactions between two NFs is defined as service so that its reuse is possible. This service enables support for modularity. The user plane supports interactions such as forwarding operations between different UPFs.

Figure 4:
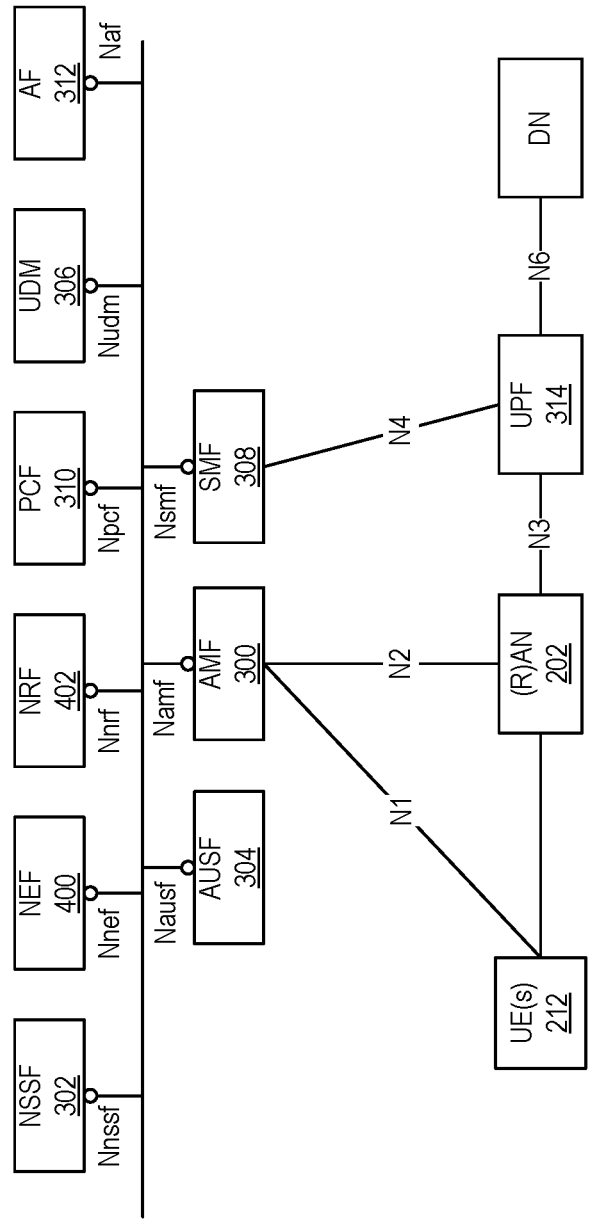

FIG. 4 illustrates a 5G network architecture using service-based interfaces between the NFs in the control plane, instead of the point-to-point reference points/interfaces used in the 5G network architecture of FIG. 3. However, the NFs described above with reference to FIG. 3 correspond to the NFs shown in FIG. 4. The service(s) etc. that a NF provides to other authorized NFs can be exposed to the authorized NFs through the service-based interface. In FIG. 4 the service based interfaces are indicated by the letter "N" followed by the name of the NF, e.g. Namf for the service based interface of the AMF 300 and Nsmf for the service based interface of the SMF 308, etc. The NEF 400 and the NRF 402 in FIG. 4 are not shown in FIG. 3 discussed above. However, it should be clarified that all NFs depicted in FIG. 3 can interact with the NEF 400 and the NRF 402 of FIG. 4 as necessary, though not explicitly indicated in FIG. 3.

Some properties of the NFs shown in FIGS. 3 and 4 may be described in the following manner. The AMF 300 provides UE-based authentication, authorization, mobility management, etc. A UE 212 even using multiple access technologies is basically connected to a single AMF 300 because the AMF 300 is independent of the access technologies. The SMF 308 is responsible for session management and allocates Internet Protocol (IP) addresses to UEs. It also selects and controls the UPF 314 for data transfer. If a UE 212 has multiple sessions, different SMFs 308 may be allocated to each session to manage them individually and possibly provide different functionalities per session. The AF 312 provides information on the packet flow to the PCF 310 responsible for policy control in order to support Quality of Service (QoS). Based on the information, the PCF 310 determines policies about mobility and session management to make the AMF 300 and SMF 308 operate properly. The AUSF 304 supports authentication function for UEs or similar and thus stores data for authentication of UEs or similar while the UDM 306 stores subscription data of the UE 212. The Data Network (DN), not part of the 5GC network, provides Internet access or operator services and similar.

An NF may be implemented either as a network element on a dedicated hardware, as a software instance running on a dedicated hardware, or as a virtualized function instantiated on an appropriate platform, e.g., a cloud infrastructure.

Figure 5:
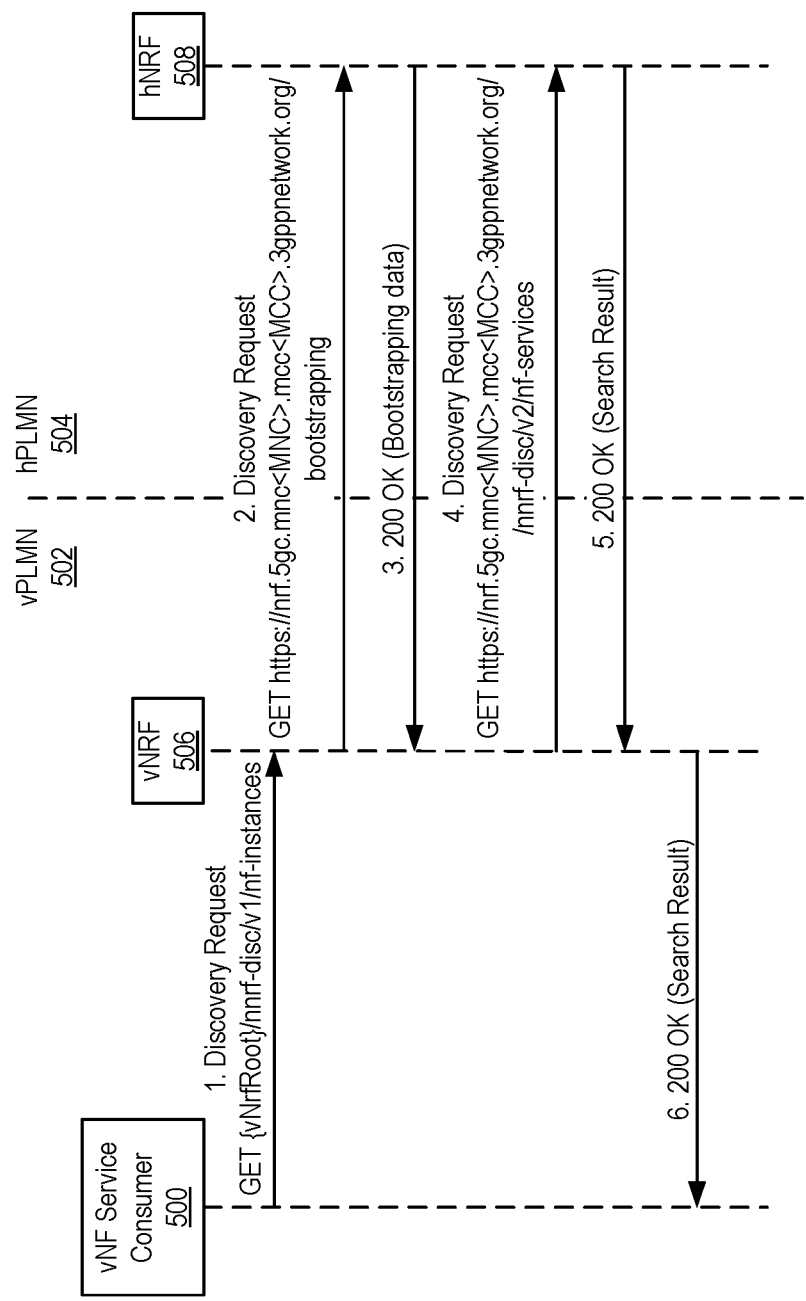
FIG. 5 shows a call flow diagram illustrating a process for interaction between a vNF in a visited Public Land Mobile Network (PLMN) (vPLMN) and an hNF in a home PLMN (hPLMN) via a visited NF Repository Function (NRF) (vNRF)/home NRF (hNRF) in accordance with an embodiment of the present disclosure.

FIG. 5 shows a call flow diagram illustrating a process for interaction between a visited NF (vNF) 500 in a vPLMN 502 and a home NF (hNF) (not shown) in an hPLMN 504 via a vNRF 506/hNRF 508 (for the vNSSF/home NSSF (hNSSF) the scenario is similar, but replacing the vNRF/hNRF discovery service with the corresponding services of the vNSSF/hNSSF). In step 1, the vNF 500 determines the address of the vNRF 506 by means of local configuration, which is feasible given that it is a configuration local to the vPLMN 502, and sends a discovery request (including a GET request for the determined address) to the vNRF 506. In step 2, the vNRF 506, after determining that it does not have any static configuration or prior information about the hPLMN 504, builds a bootstrapping URI of the hNRF 508 as follows:

> https://
> nrf.5gc.mnc<MNC>.mcc<MCC>0.3gppnetwork.org/
> bootstrapping, and sends a GET request to the hNRF 508 to retrieve the bootstrapping data. In that request, it indicates its support for the HATEOAS format defined by 3GPP: "3gppHal+json". An example request is shown below:

> GET https://
> nrf.5gc.mnc<MNC>.mcc<MCC>0.3gppnetwork.org/
> bootstrapping Accept: application/json, application/
> 3gppHal+json.

In step 3, the hNRF 508 answers with a HATEOAS document containing a number of link relations corresponding to the different services and their base URIs (which include the API major version), and maybe additional useful parameters ("status" and "load" below). An example response is shown below:

```
HTTP/2 200 OK
Content-Type: application/3gppHal+json
{
  "status": "ACTIVE",
  "load": "20%",
  "_inks": {
    "self": {
      "href": "/bootstrapping"
    },
    "management": {
      "href": "/nnrf-nfm/v1"
    },
    "discovery": {
      "href": "/nnrf-disc/v2"
    },
    "oauth2": {
      "href": "/oauth2/token"
    }
  }
}
```

As shown in the response, the hNRF 508 indicates that version 1 (v1) of the management API is available, while version 2 (v2) of the discovery API is available.

In step 4, the vNRF 506 uses the bootstrapping information received to build the effective Uniform Resource Indicators (URIs) used for the different services exposed by the hNRF 508. As shown, the vNRF 506 uses the latest version of the discovery API available, which is version 2 (v2). If the bootstrapping described above were not available, the vNRF 506 would not know which APIs were implemented by the hNRF 508 (e.g., which versions of the APIs) and thus would be forced to rely on static configuration (Service-Level Agreement (SLA)) or default to the lowest possible version of the desired API, for example, version 1 (v1). In step 5, the hNRF 508 returns the search result of the discovery to the vNRF 506. In step 6, the vNRF 506 returns the search result of the discovery to the vNF 500.

While the foregoing concepts are discussed as they relate to the discovery of available services in a home network by a network node in a visiting network, the concepts are also applicable between NFs in the same network. For example, an NF within a PLMN may communicate with an NRF in the same PLMN. Conventionally, an operator would configure the NF with an address, URIs, and API version(s) supported by the NRF. This means that every time a new API version is rolled out by the NRF, the NF must be re-configured to communicate with the NRF using the new API version. Using the bootstrapping process discussed above with respect to FIG. 5 within the same PLMN allows NFs in a PLMN to dynamically adapt to changes in an NRF in the same PLMN without reconfiguration. The same concepts apply for communication between an NF and an NSSF within the same PLMN. The NF, the NRF, and the NSSF may be referred to generically as a first NF, a second NF, etc. in embodiments discussed herein.

Figure 6:
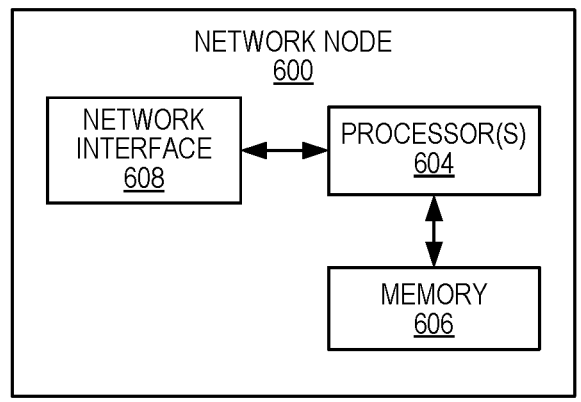
FIGS. 6 through 8 are schematic block diagrams of example embodiments of a network node in which embodiments of the present disclosure may be implemented.

FIG. 6 is a schematic block diagram of a network node 600 according to some embodiments of the present disclosure. The network node 600 may be, for example, a network node that implements a core network entity or core network function such as, e.g., the vNF service consumer of FIG. 5, the vNRF of FIG. 5, or the hNRF of FIG. 5. As illustrated, the network node 600 includes one or more processors 604 (e.g., Central Processing Units (CPUs), Application Specific Integrated Circuits (ASICs), Field Programmable Gate Arrays (FPGAs), and/or the like), memory 606, and a network interface 608. The one or more processors 604 are also referred to herein as processing circuitry. The one or more processors 604 operate to provide one or more functions of a network node 600 as described herein (e.g., one or more functions of the vNF service consumer of FIG. 5, one or more functions of the vNRF of FIG. 5, or one or more functions of the hNRF of FIG. 5, as described above). In some embodiments, the function(s) are implemented in software that is stored, e.g., in the memory 606 and executed by the one or more processors 604.

Figure 7:
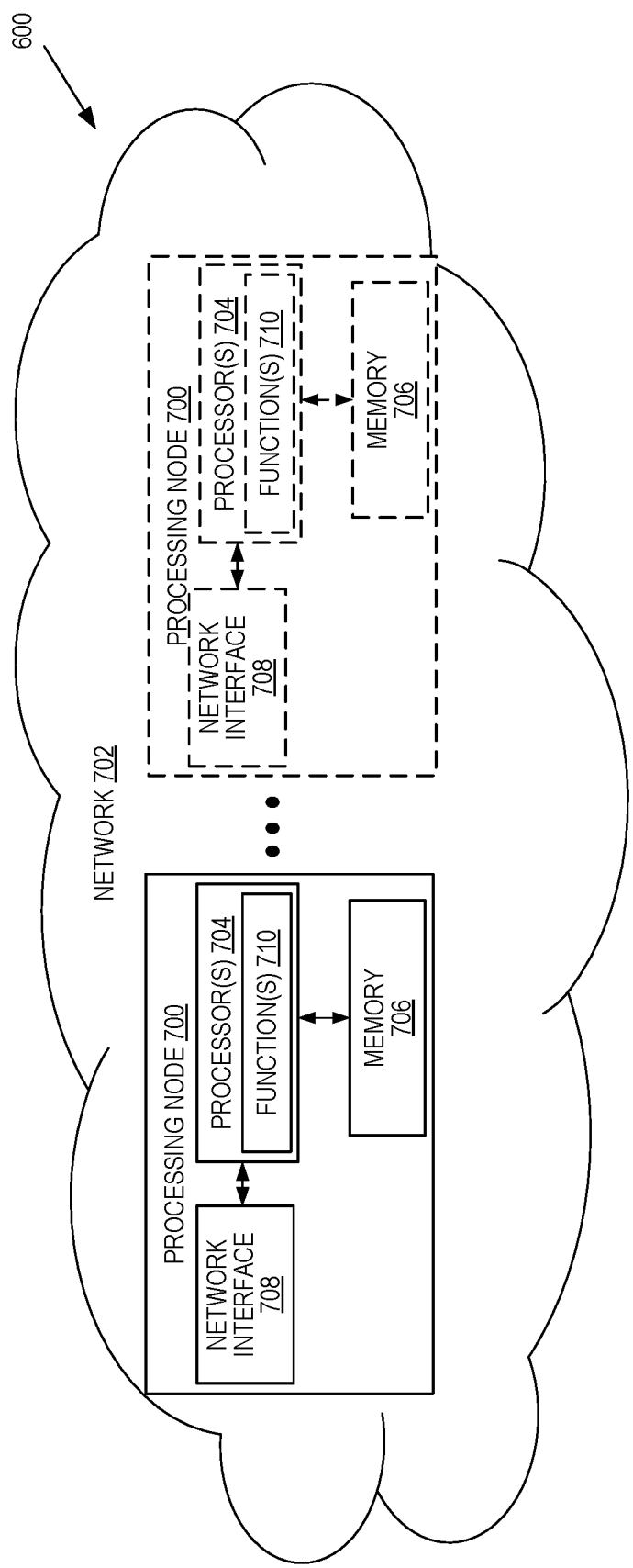

FIG. 7 is a schematic block diagram that illustrates a virtualized embodiment of the network node 600 according to some embodiments of the present disclosure. As used herein, a "virtualized" network node is an implementation of the network node 600 in which at least a portion of the functionality of the network node 600 (e.g., one or more functions of the vNF service consumer of FIG. 5, one or more functions of the vNRF of FIG. 5, or one or more functions of the hNRF of FIG. 5, as described above) is implemented as a virtual component(s) (e.g., via a virtual machine(s) executing on a physical processing node(s) in a network(s)). As illustrated, in this example, the network node 600 includes one or more processing nodes 700 coupled to or included as part of a network(s) 702. Each processing node 700 includes one or more processors 704 (e.g., CPUs, ASICs, FPGAs, and/or the like), memory 706, and a network interface 708.

In this example, functions 710 of the network node 600 described herein (e.g., one or more functions of the vNF service consumer of FIG. 5, one or more functions of the vNRF of FIG. 5, or one or more functions of the hNRF of FIG. 5, as described above) are implemented at the one or more processing nodes 700 or distributed across two or more processing nodes 700 in any desired manner. In some particular embodiments, some or all of the functions 710 of the network node 600 described herein (e.g., one or more functions of the vNF service consumer of FIG. 5, one or more functions of the vNRF of FIG. 5, or one or more functions of the hNRF of FIG. 5, as described above) are implemented as virtual components executed by one or more virtual machines implemented in a virtual environment(s) hosted by the processing node(s) 700.

In some embodiments, a computer program including instructions which, when executed by at least one processor, causes the at least one processor to carry out the functionality of the network node 600 or a node (e.g., a processing node 700) implementing one or more of the functions 710 of the network node 600 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 8:
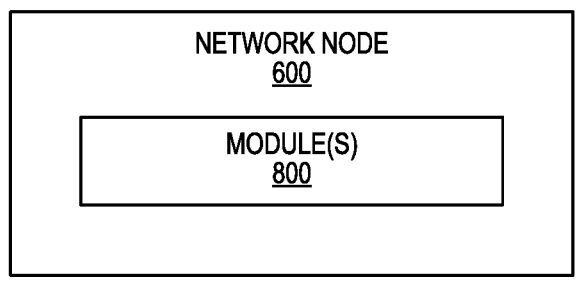

FIG. 8 is a schematic block diagram of the network node 600 according to some other embodiments of the present disclosure. The network node 600 includes one or more modules 800, each of which is implemented in software. The module(s) 800 provide the functionality of the network node 600 described herein (e.g., one or more functions of the vNF service consumer of FIG. 5, one or more functions of the vNRF of FIG. 5, or one or more functions of the hNRF of FIG. 5, as described above). This discussion is equally applicable to the processing node 700 of FIG. 7 where the modules 800 may be implemented at one of the processing nodes 700 or distributed across multiple processing nodes 700 and/or distributed across two or more of the processing nodes 700.

One example implementation of at least some aspects of the solutions described herein is shown below as changes to 3GPP Technical Specification (TS) 29.510 V16.1.0.

\*\*\*\*\*\*\*\*\*\*\*\*\*\*\*\*First Change to TS 29.510 V16.1.0 (ALL NEW)\*\*\*\*\*\*\*\*\*\*\*\*\*\*\*\*

Figure 9:
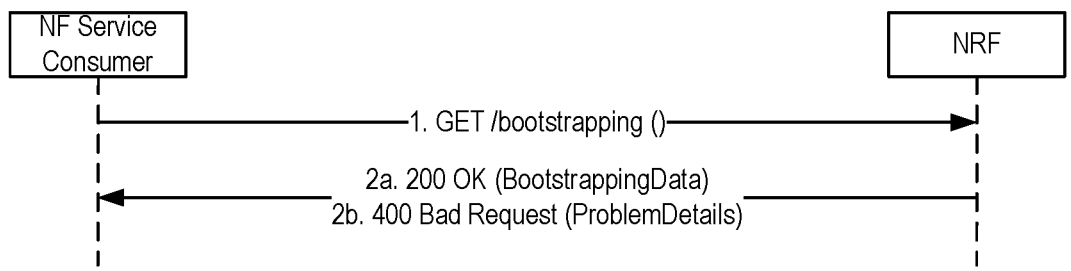
FIG. 9 illustrates a bootstrapping request in accordance with an embodiment of the present disclosure.

5.x Nnrf_Bootstrapping Service
5.x.1 Service Description
The NRF offers an Nnrf_Bootstrapping service to let NF Service Consumers of the NRF know about the services endpoints it supports, by using a version-independent URI endpoint that does not need to be discovered by using a Discovery service.
This service shall be used in inter-PLMN scenarios where the NRF in a PLMN-A needs to invoke services from an NRF in PLMN-B, when there is no pre-configured information indicating the version of the services deployed in PLMN-B.
This service may also be used in intra-PLMN scenarios, to avoid configuring statically in the different NFs information about the service versions deployed in the NRF to be used by those NFs.
5.x.2 Service Operations
5.x.2.1 Introduction
The services operations defined for the Nnrf Bootstrapping service are as follows:
   Nnrf Bootstrapping Get
5.x.2.2 Get
5.x.2.2.1 General
This service operation is used by an NF Service Consumer to request bootstrapping information from the NRF.
See FIG. 9
FIG. 5.x.2.2.1-1: Bootstrapping Request
  1. The NF Service Consumer shall send a GET request to the "Bootstrapping Endpoint", as described in 3GPP TS 23.003 [xx], clause x.y. The "Bootstrapping Endpoint" URI shall be:
    {nrfApiRoot}/bootstrapping
    where {nrfApiRoot} represents the concatenation of the "scheme" and "authority" components of the NRF, as defined in IETF RFC 3986 [17].
  2. On success, "200 OK" shall be returned, the payload body of the GET response shall contain the requested bootstrapping information.

Example

```
GET https://nrf.example.com/bootstrapping
Accept: application/3gppHal+json
HTTP/2 200 OK
Content-Type: application/3gppHal+json
{
  "status": "OPERATIVE",
  "_links": {
    "self": {
      "href": "https://nrf.example.com/bootstrapping"
    },
    "manage": {
      "href": "https://nrf.example.com/nnrf-nfm/v1/nf-instances"
    },
    "subscribe": {
      "href": "https://nrf.example.com/nnrf-nfm/v1/subscriptions"
    },
    "discover": {
      "href": "https://nrf.example.com/nnrf-disc/v1/nf-instances"
    },
    "authorize": {
      "href": "https://nrf.example.com/oauth2/token"
    }
  }
}
```

\*\*\*\*\*\*\*\*\*\*\*\*\*\*\*\*Next Change to TS 29.510 V16.1.0 (ALL NEW)\*\*\*\*\*\*\*\*\*\*\*\*\*\*\*\*

6.x Nnrf_Bootstrapping Service API
6.x.1 API URI
URIs of this API shall have the following root:
{nrfApiRoot}
where {nrfApiRoot} represents the concatenation of the "scheme" and "authority" components of the NRF, as defined in IETF RFC 3986 [17].
6.x.2 Usage of HTTP
6.x.2.1 General
HTTP/2, as defined in IETF RFC 7540 [9], shall be used as specified in clause 5 of 3GPP TS 29.500 [4].
HTTP/2 shall be transported as specified in clause 5.3 of 3GPP TS 29.500 [4].
HTTP messages and bodies this API shall comply with the OpenAPI [10] specification contained in Annex A.
6.x.2.2 HTTP Standard Headers
6.x.2.2.1 General
The HTTP headers as specified in clause 4.4 of IETF RFC 6749 [16] shall be supported, with the exception that there shall not be "Authorization" HTTP request header in the access token request.
6.x.2.2.2 Content Type
The following content types shall be supported:
  The JSON format (IETF RFC 8259 [22]). The use of the JSON format shall be signalled by the content type "application/json". See also clause 5.4 of 3GPP TS 29.500 [4].
  The Problem Details JSON Object (IETF RFC 7807 [11]). The use of the Problem Details JSON object in a HTTP response body shall be signalled by the content type "application/problem+json".
  The 3GPP hypermedia format as defined in 3GPP TS 29.501 [5]. The use of the 3GPP hypermedia format in a HTTP response body shall be signalled by the content type "application/3gppHal+json".

6.x.2.3 HTTP Custom Headers
6.x.2.3.1 General

In this release of this specification, no custom headers specific to the Nnrf_Bootstrapping Service API are defined. For 3GPP specific HTTP custom headers used across all service-based interfaces, see clause 5.2.3 of 3GPP TS 29.500 [4].

6.x.3 Resources
6.x.3.1 Overview

The structure of the Resource URIs of the Nnrf_Bootstrapping service is shown in figure 6.x.3.1-1.

Figure 10:
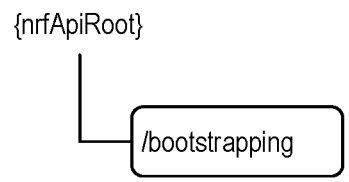
FIG. 10 illustrates a resource Uniform Resource Indicator (URI) structure of a NRF bootstrapping Application Programming Interface (API) in accordance with an embodiment of the present disclosure.

See FIG. 10

FIG. 6.x.3.1-1: Resource URI Structure of the Nnrf_Bootstrapping API

Table 6.x.3.1-1 provides an overview of the resources and applicable HTTP methods.

TABLE 6.x.3.1-1

Resources and methods overview

| Resource name | Resource URI | HTTP method or custom operation | Description |
|---|---|---|---|
| Bootstrapping (Document) | {nrfApiRoot}/ bootstrapping | GET | Retrieve a collection of links pointing to other services exposed by NRF. |

6.x.3.2 Resource: Bootstrapping (Document)
6.x.3.2.1 Description

This resource represents a collection of links pointing to other services exposed by NRF.

This resource is modelled as the Document resource archetype (see clause C.3 of 3GPP TS 29.501 [5]).

6.x.3.2.2 Resource Definition

Resource URI: {nrfApiRoot}/bootstrapping

This resource shall support the resource URI variables defined in table 6.x.3.2.2-1.

TABLE 6.x.3.2.2-1

Resource URI variables for this resource

| Name | Definition |
|---|---|
| nrfApiRoot | See clause 6.x.1 |

6.x.3.2.3 Resource Standard Methods
6.x.3.2.3.1 GET

This method retrieves a list of links pointing to other services exposed by NRF. This method shall support the URI query parameters specified in table 6.x.3.2.3.1-1.

TABLE 6.x.3.2.3.1-1

URI query parameters supported by the GET method on this resource

| Name | Data type | P | Cardinality | Description |
|---|---|---|---|---|
| n/a | n/a | | | |

This method shall support the request data structures specified in table 6.x.3.2.3.1-2 and the response data structures and response codes specified in table 6.x.3.2.3.1-3.

TABLE 6.x.3.2.3.1-2

Data structures supported by the GET Request Body on this resource

| Data type | P | Cardinality | Description |
|---|---|---|---|
| n/a | | | |

TABLE 6.x.3.2.3.1-3

Data structures supported by the GET Response Body on this resource

| Data type | P | Cardinality | Response codes | Description |
|---|---|---|---|---|
| BootstrappingInfo | M | 1 | 200 OK | The response body contains a "_links" object containing the URI of each service exposed by the NRF. |

NOTE:
The mandatory HTTP error status codes for the GET method listed in Table 5.2.7.1-1 of 3GPP TS 29.500 [4] other than those specified in the table above also apply, with a ProblemDetails data type (see clause 5.2.7 of 3GPP TS 29.500 [4]).

6.x.4 Custom Operations without Associated Resources

There are no custom operations defined without any associated resources for the Nnrf_Bootstrapping service in this release of the specification.

6.x.5 Notifications

There are no notifications defined for the Nnrf_Bootstrapping service in this release of the specification.

6.x.6 Data Model
6.x.6.1 General

This clause specifies the application data model supported by the API.

Table 6.x.6.1-1 specifies the data types defined for the Nnrf_Bootstrapping service-based interface protocol.

TABLE 6.x.6.1-1

Nnrf_Bootstrapping specific Data Types

| Data type | Clause defined | Description |
|---|---|---|
| BootstrappingInfo | 6.x.6.2.2 | |

Table 6.x.6.1-2 specifies data types re-used by the Nnrf_Bootstrapping service-based interface protocol from other specifications, including a reference to their respective specifications and when needed, a short description of their use within the Nnrf service-based interface.

TABLE 6.x.6.1-2

Nnrf_Bootstrapping re-used Data Types

| Data type | Reference | Comments |
|---|---|---|
| LinksValueSchema | 3GPP TS 29.571 [7] | 3GPP Hypermedia link |
| ProblemDetails | 3GPP TS 29.571 [7] | |

6.x.6.2 Structured Data Types
6.x.6.2.1 Introduction This clause defines the structures to be used in resource representations.
6.x.6.2.2 Type: Bootstrapping Info TABLE 6.x.6.2.2-1

Definition of type BootstrappingInfo

| Attribute name | Data type | P | Cardinality | Description |
|---|---|---|---|---|
| status | Status | O | 0...1 | Status of the NRF (operative, non-operative, ...) |
| _links | map(LinksValueSchema) | M | 1...N | Map of LinksValueSchema objects, where the keys are the link relations, as described in Table 6.x.6.3.3.1-1, and the values are objects containing an "href" attribute, whose value is an absolute URI corresponding to each link relation. |

6.x.6.3 Simple Data Types and Enumerations 6.x.6.3.1 Introduction

This clause defines simple data types and enumerations that can be referenced from data structures defined in the previous clauses.

6.x.6.3.2 Enumeration: Status

TABLE 6.x.6.3.2-1

Enumeration Status

| Enumeration value | Description |
|---|---|
| "OPERATIVE" | The NRF is operative |
| "NON_OPERATIVE" | The NRF is not operative |

6.x.6.3.3 Relation Types 6.x.6.3.3.1 General

This clause describes the possible relation types defined within NRF API. See clause 4.7.5.2 of 3GPP TS 29.501 [5] for the description of the relation types.

TABLE 6.x.6.3.3.1-1 supported regestired relation types

| Relation Name | Description |
|---|---|
| self | The "href" attribute of the object associated to this relation type contains the URI of the same resource returned in the response body (i.e. the "bootstrapping" resource). |
| manage | The "href" attribute of the object associated to this relation type contains the URI of the resource used in the Nnrf_NFManagement API to register/deregister/update NF Instances profiles in the NRF (i.e. the "nf-instances" store resource). |
| subscribe | The "href" attribute of the object associated to this relation type contains the URI of the resource used in the Nnrf_NFManagement API to manage subscriptions to the NRF (i.e. the "subscriptions" collection resource). |
| discover | The "href" attribute of the object associated to this relation type contains the URI of the resource used in the Nnr_NFManagement API (i.e. the "subscriptions" collection resource). |

TABLE 6.x.6.3.3.1-1-continued supported regestired relation types

| Relation Name | Description |
|---|---|
| authorize | The "href" attribute of the object associated to this relation type contains the URI of the Oauth2 Access Token Request endpoint, used to request authorization to other APIs in the 5G Core Network. |

***************Next Change to TS 29.510 V16.1.0 (ALL NEW)***************

A.x Nnrf_Bootstrapping API

```
openapi: 3.0.0
info:
  version: '1.0.0.alpha-1'
  title: 'NRF Bootstrapping'
  description: |
    NRF Bootstrapping.
    © 2019, 3GPP Organizational Partners (ARIB, ATIS, CCSA, ETSI, TSDSI, TTA, TTC).
    All rights reserved.
externalDocs:
  description: 3GPP TS 29.510 V16.2.0; 5G System; Network Function Repository Services; Stage 3
  url: 'http://www.3gpp.org/ftp/Specs/archive/29_series/29.510/'
paths:
  /bootstrapping:
    get:
      summary: Bootstrapping Info Request
      operationId: BootstrappingInfoRequest
      tags:
        - Bootstrapping Request
      responses:
        '200':
          description: Successful Bootstrapping Request
          content:
            application/3gppHal+json:
              schema:
                $ref: '#/components/schemas/BootstrappingInfo'
        '400':
          $ref: 'TS29571_CommonData.yaml#/components/responses/400'
        '500':
          $ref: 'TS29571_CommonData.yaml#/components/responses/500'
        default:
          $ref:
```

-continued

```
'TS29571_CommonData.yaml#/components/responses/default'
components:
  schemas:
    BootstrappingInfo:
      type: object
      required:
        - _links
      properties:
        status:
          $ref: '#/components/schemas/Status'
        _links:
          type: object
          description: 'Map of link objects where the keys are
the link relations defined in 3GPP TS 29.510 clause 6.x.6.3.3'
          additionalProperties:
            $ref:
'TS29571_CommonData.yaml#/components/schemas/LinksValueSchema'
          minProperties: 1
    Status:
      anyOf:
        - type: string
          enum:
            - OPERATIVE
            - NON_OPERATIVE
        - type: string
```

\*\*\*\*\*\*\*\*\*\*\*\*\*\*\*\*\*\*\*\*End Changes to TS 29.510 V16.1.0\*\*\*\*\*\*\*\*\*\*\*\*\*\*\*\*\*\*\*\*

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Some example embodiments of the present disclosure are as follows:

Embodiment 1: A method performed by a network node that implements a home network function for discovery of services available in a home network from a visiting network, the method comprising: receiving (FIG. 5, step 2) a request for discovery of services from a network node that implements a visiting network function in the visiting network; and providing (FIG. 5, step 3) information about one or more services supported in the home network to the visiting network function.

Embodiment 2: The method of the embodiment 1, wherein the home network function is a Network Function (NF) Repository Function (NRF) in a 5G core network.

Embodiment 3: The method of embodiment 2, wherein the visiting network function is an NRF in the 5G core network.

Embodiment 4: The method of embodiment 1, wherein the home network function is a Network Slice Selection Function (NSSF) in a 5G core network.

Embodiment 5: The method of embodiment 4, wherein the visiting network function is an NSSF in the 5G core network.

Embodiment 6: The method of any one of embodiments 1 to 5, wherein the request for discovery of services is an HTTP request.

Embodiment 7: The method of any one of embodiments 1 to 6, wherein the information about one or more services supported in the home network is provided according to Hypermedia as the Engine of Application State (HATEOAS).

Embodiment 8: The method of any one of embodiments 1 to 7, wherein the information about one or more services supported in the home network comprises a version of one or more Application Programming Interfaces (APIs) supported by the home network function.

Embodiment 9: The method of any one of embodiments 1 to 8, wherein the home network and the visiting network are Public Land Mobile Networks (PLMNs).

Embodiment 10: The method of any one of embodiments 1 to 9, wherein the request for discovery of services includes a mobile country code (MCC) and a mobile network code (MNC) associated with user equipment (UE) in the visiting network, wherein the UE is attempting to access one or more services in the home network from the visiting network.

Embodiment 11: A method performed by a network node that implements a visiting network function for discovery of services available in a home network from a visiting network, the method comprising: requesting (FIG. 5, step 2), from a network node that implements a home network function in the home network, information about services supported in the home network; and receiving (FIG. 5, step 3), from the home network function, information about one or more services supported in the home network.

Embodiment 12: The method of the embodiment 11, wherein the home network function is a Network Function (NF) Repository Function (NRF) in a 5G core network.

Embodiment 13: The method of embodiment 12, wherein the visiting network function is an NRF in the 5G core network.

Embodiment 14: The method of embodiment 11, wherein the home network function is a Network Slice Selection Function (NSSF) in a 5G core network.

Embodiment 15: The method of embodiment 14, wherein the visiting network function is an NSSF in the 5G core network.

Embodiment 16: The method of any one of embodiments 11 to 15, wherein requesting information about services supported in the home network comprises sending an HTTP request to the home network function.

Embodiment 17: The method of any one of embodiments 11 to 16, wherein the information about one or more services supported in the home network is provided according to Hypermedia as the Engine of Application State (HATEOAS).

Embodiment 18: The method of any one of embodiments 11 to 17, wherein the information about one or more services supported in the home network comprises a version of one or more Application Programming Interfaces (APIs) supported by the home network function.

Embodiment 19: The method of any one of embodiments 11 to 18, wherein the home network and the visiting network are Public Land Mobile Networks (PLMNs).

Embodiment 20: The method of any one of embodiments 1 to 19, wherein requesting information about services supported in the home network comprises sending a mobile country code (MCC) and a mobile network code (MNC) associated with user equipment (UE) in the visiting network to the home network node, wherein the UE is attempting to access one or more services in the home network from the visiting network.

Embodiment 21: A network node adapted to perform the method of any one of embodiments 1 to 19.

Embodiment 22: A network node comprising processing circuitry and a memory storing instructions, which, when executed by the processing circuitry cause the network node to perform the method of any one of embodiments 1 to 19.

Embodiment 23: A method performed by a network node that implements a first network function for discovery of services available in a network, the method comprising: receiving (FIG. 5, step 2) a request for discovery of services from a network node that implements a second network function; and providing (FIG. 5, step 3) information about one or more services supported in the network to the second network function.

Embodiment 24: The method of embodiment 22, wherein the first network function is a Network Function (NF) Repository Function (NRF) in a 5G core network.

Embodiment 25: The method of embodiment 23, wherein the second network function is an NF in the 5G core network.

Embodiment 26: The method of embodiment 22, wherein the first network function is a Network Slice Selection Function (NSSF) in a 5G core network.

Embodiment 27: The method of embodiment 25, wherein the second network function is an NF in the 5G core network.

Embodiment 28: The method of any one of embodiments 22 to 27, wherein the request for discovery of services is an HTTP request.

Embodiment 29: The method of any one of embodiments 22 to 28, wherein the information about one or more services supported in the network is provided according to Hypermedia as the Engine of Application State (HATEOAS).

Embodiment 30: The method of any one of embodiments 22 to 29, wherein the information about one or more services supported in the network comprises a version of one or more Application Programming Interfaces (APIs) supported by the first network function.

Embodiment 31: The method of any one of embodiments 22 to 30, wherein the network is a Public Land Mobile Network (PLMN).

Embodiment 32: The method of any one of embodiments 22 to 31, wherein the request for discovery of services includes a mobile country code (MCC) and a mobile network code (MNC) associated with user equipment (UE) in the network, wherein the UE is attempting to access one or more services in the network via the second network function.

Embodiment 33: A method performed by a network node that implements a first network function for discovery of services available in a network, the method comprising: requesting (FIG. 5, step 2), from a network node that implements a second network function, information about services supported in the home network; and receiving (FIG. 5, step 3), from the second network function, information about one or more services supported in the home network.

Embodiment 34: The method of embodiment 33, wherein the second network function is a Network Function (NF) Repository Function (NRF) in a 5G core network.

Embodiment 35: The method of embodiment 34, wherein the first network function is an NF in the 5G core network.

Embodiment 36: The method of embodiment 33, wherein the second network function is a Network Slice Selection Function (NSSF) in a 5G core network.

Embodiment 37: The method of embodiment 36, wherein the second network function is an NF in the 5G core network.

Embodiment 38: The method of any one of embodiments 33 to 37, wherein requesting information about services supported in the home network comprises sending an HTTP request to the second network function.

Embodiment 39: The method of any one of embodiments 33 to 38, wherein the information about one or more services supported in the home network is provided according to Hypermedia as the Engine of Application State (HATEOAS).

Embodiment 40: The method of any one of embodiments 33 to 39, wherein the information about one or more services supported in the network comprises a version of one or more Application Programming Interfaces (APIs) supported by the second network function.

Embodiment 41: The method of any one of embodiments 33 to 43, wherein the network is a Public Land Mobile Network (PLMN).

Embodiment 42: The method of any one of embodiments 33 to 44, wherein requesting information about services supported in the network comprises sending a mobile country code (MCC) and a mobile network code (MNC) associated with user equipment (UE) in the network to the second network function, wherein the UE is attempting to access one or more services in the network via the first network function.

Embodiment 43: A network node adapted to perform the method of any one of embodiments 23 to 42.

Embodiment 44: A network node comprising processing circuitry and a memory storing instructions, which, when executed by the processing circuitry cause the network node to perform the method of any one of embodiments 23 to 43.

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
5GC Fifth Generation Core
5GS Fifth Generation System
AF Application Function
AMF Access and Mobility Function
AN Access Network
API Application Programming Interface
ASIC Application Specific Integrated Circuit
AUSF Authentication Server Function
CPU Central Processing Unit
DN Data Network
DSP Digital Signal Processor
eNB Enhanced or Evolved Node B
FPGA Field Programmable Gate Array
FQDN Fully Qualified Domain Name
gNB New Radio Base Station
HATEOAS Hypermedia as the Engine of Application State
hNF Home Network Function hNRF Home Network Function Repository Function
hNSSF Home Network Slice Selection Function
hPLMN Home Public Land Mobile Network
HSS Home Subscriber Server
HTTP Hyper-Text Transfer Protocol
IP Internet Protocol
LTE Long Term Evolution
MCC Mobile Country Code
MME Mobility Management Entity
MNC Mobile Network Code
MTC Machine Type Communication
NEF Network Exposure Function
NF Network Function
NR New Radio
NRF Network Function Repository Function
NSSF Network Slice Selection Function
PCF Policy Control Function
P-GW Packet Data Network Gateway
PLMN Public Land Mobile Network
QoS Quality of Service
RAM Random Access Memory
RAN Radio Access Network
REST Representational State Transfer
ROM Read Only Memory
RRH Remote Radio Head
RU Round Trip Time
SCEF Service Capability Exposure Function
SLA Service-Level Agreement
SMF Session Management Function
TCP Transmission Control Protocol
TS Technical Specification
UDM Unified Data Management
UE User Equipment
UPF User Plane Function
URI Uniform Resource Indicator
vNF Visited Network Function
vNRF Visited Network Function Repository Function
vNSSF Visited Network Slice Selection Function
vPLMN Visited Public Land Mobile Network Those skilled in the art will recognize improvements and modifications to the embodiments of the present disclosure. All such improvements and modifications are considered within the scope of the concepts disclosed herein.

What is claimed is:

1. A method performed by a first Network Function, NF, in a core network of a cellular communications system, the method comprising:
   receiving, from a second NF, a request to retrieve bootstrapping information of one or more services supported by the first NF; and
   responsive to receiving the request, sending to the second NF, the bootstrapping information about the one or more services exposed by the first NF;
   wherein the first NF is a Network Repository Function, NRF, and the second NF is an NF service consumer;
   wherein the bootstrapping service is separate from a discovery service of the NRF;
   wherein the request is a Hyper-Text Transfer Protocol, HTTP, GET request addressed to {nrfApiRoot}/bootstrapping, where {nrfApiRoot} is a concatenation of a scheme component and an authority component of the NRF.

2. The method of claim 1 wherein the first NF is an NRF in a first PLMN, and the second NF is a second NRF in a second PLMN.

3. The method of claim 1 wherein the first NF is a home NRF, hNRF, and the second NF is a visited NRF, vNRF.

4. The method of claim 1 wherein the bootstrapping information about one or more services exposed by the first NF comprises a links objects pointing to one or more services exposed by the first NF.

5. The method of claim 1 wherein the request is a Hyper-Text Transfer Protocol, HTTP, GET request addressed to https://nrf.5gc.mnc<MNC>.mcc<MCC>0.3gppnetwork.org/bootstrapping, where "MNC" is a mobile network code of a particular UE associated with the request and "MCC" is a mobile country code of the particular UE.

6. The method of claim 1 wherein the request comprises an indication of support for a Hypermedia as the Engine of Application State, HATEOAS, format.

7. The method of claim 6 wherein the HATEOAS format is the 3gppHal+json format.

8. The method of claim 6 wherein sending the bootstrapping information about the one or more services exposed by the first NF to the second NF comprises sending the bootstrapping information in a HATEOAS document that contains a number of link relations that correspond to the one or more services exposed by the first NF and base Uniform Resource Indicators, URIs, of the one or more services, wherein the base URIs comprise Application Programming Interface, API, major versions of the one or more services.

9. The method of claim 1 wherein the bootstrapping information about the one or more services exposed by the first NF comprise Application Programming Interface, API, versions of the one or more services exposed by the first NF.

10. The method of claim 9 wherein the bootstrapping information about the one or more services exposed by the first NF further comprises one or more additional parameters.

11. The method of claim 10 wherein the one or more additional parameters comprise load, status, or both load and status.

12. A network node that implements a first Network Function, NF, for a core network of a cellular communications system, the network node comprising processing circuitry configured to cause the network node to:
   receive, from a second NF, a request to retrieve bootstrapping information of one or more services supported by the first NF; and
   responsive to receiving the request, send to the second NF, the bootstrapping information about the one or more services exposed by the first NF;
   wherein the first NF is a Network Repository Function, NRF, and the second NF is an NF service consumer;
   wherein the bootstrapping service is separate from a discovery service of the NRF;
   wherein the request is a Hyper-Text Transfer Protocol, HTTP, GET request addressed to {nrfApiRoot}/bootstrapping, where {nrfApiRoot} is a concatenation of a scheme component and an authority component of the NRF.

13. The network node of claim 12 wherein the first NF is an NRF in a first PLMN, and the second NF is a second NRF in a second PLMN.

14. The network node of claim 12 wherein the first NF is a home NRF, hNRF, and the second NF is a visited NRF, vNRF.

15. The network node of claim 12 wherein the bootstrapping information about one or more services exposed by the first NF comprises a links objects pointing to one or more services exposed by the first NF.

16. A method performed by a second Network Function, NF, in a core network of a cellular communications system, the method comprising:
   sending, to a first NF, a request to retrieve bootstrapping information of one or more services supported by the first NF; and
   responsive to sending the request, receiving from the first NF, the bootstrapping information about the one or more services exposed by the first NF;
   wherein the first NF is a Network Repository Function, NRF, and the second NF is an NF service consumer;
   wherein the bootstrapping service is separate from a discovery service of the NRF;
   wherein the request is a Hyper-Text Transfer Protocol, HTTP, GET request addressed to {nrfApiRoot}/bootstrapping, where {nrfApiRoot} is a concatenation of a scheme component and an authority component of the NRF.

17. The method of claim 16 wherein the first NF is an NRF in a first PLMN, and the second NF is a second NRF in a second PLMN.

18. The method of claim 16 wherein the first NF is a home NRF, hNRF, and the second NF is a visited NRF, vNRF.

19. The method of claim 16 wherein the bootstrapping information about one or more services exposed by the first NF comprises a links objects pointing to one or more services exposed by the first NF.

20. The method of claim 16 wherein the request is a Hyper-Text Transfer Protocol, HTTP, GET request addressed to https://nrf.5gc.mnc<MNC>.mcc<MCC>0.3gppnetwork.org/bootstrapping, where "MNC" is a mobile network code of a particular UE associated with the request and "MCC" is a mobile country code of the particular UE.

21. The method of claim 16 wherein the request comprises an indication of support for a Hypermedia as the Engine of Application State, HATEOAS, format.

22. The method of claim 21 wherein the HATEOAS format is the 3gppHal+json format.

23. The method of claim 21 wherein receiving the bootstrapping information about the one or more services exposed by the first NF comprises receiving the bootstrapping information in a HATEOAS document that contains a number of link relations that correspond to the one or more services exposed by the first NF and base Uniform Resource Indicators, URIs, of the one or more services, wherein the base URIs comprise Application Programming Interface, API, major versions of the one or more services.

24. The method of claim 16 wherein the bootstrapping information about the one or more services exposed by the first NF comprise Application Programming Interface, API, versions of the one or more services exposed by the first NF.

25. The method of claim 24 wherein the bootstrapping information about the one or more services exposed by the first NF further comprise one or more additional parameters.

26. The method of claim 25 wherein the one or more additional parameters comprise load, status, or both load and status.

27. A network node that implements a second Network Function, NF, for a core network of a cellular communications system, the second NF comprising processing circuitry configured to cause the network node to:
   send, to a first NF, a request to retrieve bootstrapping information of one or more services supported by the first NF; and
   responsive to sending the request, receive from the first NF, the bootstrapping information about the one or more services exposed by the first NF;
   wherein the first NF is a Network Repository Function, NRF, and the second NF is an NF service consumer; and the first NF is a home NRF, hNRF, and the second NF is a visited NRF, vNRF;
   wherein the bootstrapping service is separate from a discovery service of the NRF;
   wherein the request is a Hyper-Text Transfer Protocol, HTTP, GET request addressed to {nrfApiRoot}/bootstrapping, where {nrfApiRoot} is a concatenation of a scheme component and an authority component of the NRF.

28. A method performed by a first Network Function, NF, in a core network of a cellular communications system, the method comprising:
   receiving, from a second NF, a request to retrieve bootstrapping information of one or more services supported by the first NF; and
   responsive to receiving the request, sending to the second NF, the bootstrapping information about the one or more services exposed by the first NF;
   wherein the first NF is a Network Repository Function, NRF, and the second NF is an NF service consumer;
   wherein the bootstrapping service is separate from a discovery service of the NRF;
   wherein the request is a Hyper-Text Transfer Protocol, HTTP, GET request addressed to https://nrf.5gc.mnc<MNC>.mcc<MCC>0.3gppnetwork.org/bootstrapping, where "MNC" is a mobile network code of a particular UE associated with the request and "MCC" is a mobile country code of the particular UE.

* * * * *

UNITED STATES PATENT AND TRADEMARK OFFICE
CERTIFICATE OF CORRECTION

PATENT NO. : 12,167,324 B2
APPLICATION NO. : 17/635741
DATED : December 10, 2024
INVENTOR(S) : de-Gregorio-Rodriguez et al.

Page 1 of 1

It is certified that error appears in the above-identified patent and that said Letters Patent is hereby corrected as shown below:

In the Specification

In Column 5, Line 61, delete "Access and Mobility Function (AMF)," and insert -- Access and Mobility Management Function (AMF), --, therefor.

In Column 7, Line 65, delete "Round Trip Time (RU)" and insert -- Round Trip Time (RTT) --, therefor.

In Column 9, Line 30, delete ""_inks":" and insert -- "_links": --, therefor.

In Column 11, Line 48, delete "Nnrf Bootstrapping" and insert -- Nnrf_Bootstrapping --, therefor.

In Column 11, Line 50, delete "Nnrf Bootstrapping Get" and insert -- - Nnrf_Bootstrapping_Get --, therefor.

In Column 15, Line 65, delete "Nnr_NFManagement" and insert -- Nnrf_NFManagement --, therefor.

In Column 20, Line 53, delete "AMF Access and Mobility Function" and insert -- AMF Access and Mobility Management Function --, therefor.

In the Claims

In Column 21, Line 26, delete "RU" and insert -- RTT --, therefor.

Signed and Sealed this
Twelfth Day of August, 2025

Coke Morgan Stewart
*Acting Director of the United States Patent and Trademark Office*